Nov. 15, 1966   J. H. CASTOE   3,285,622
CASTER AND CAMBER ADJUSTING CLAMP MEANS
Filed Oct. 19, 1964
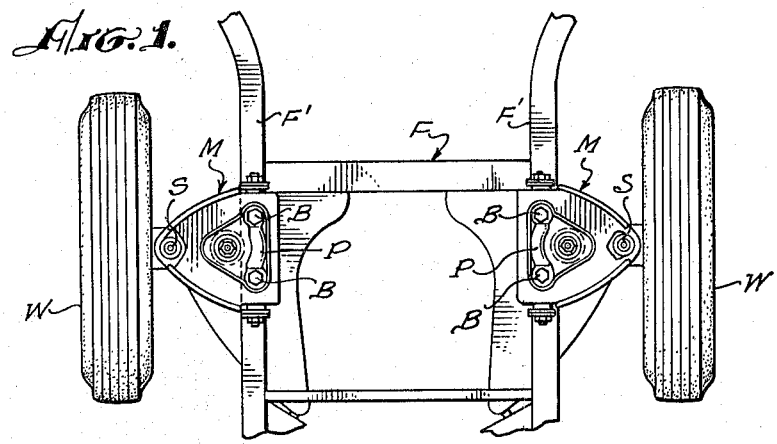
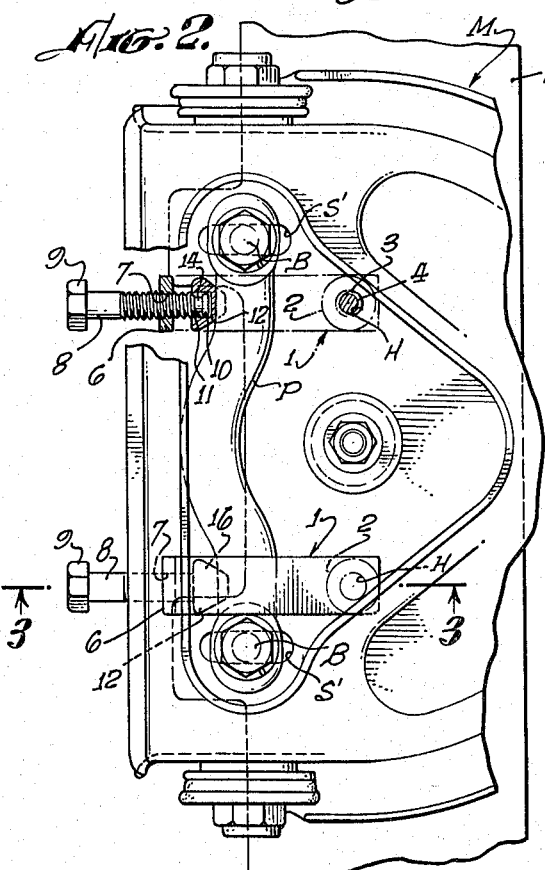
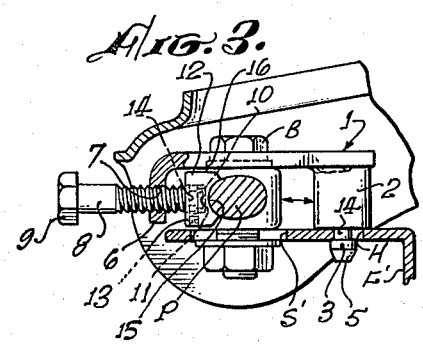
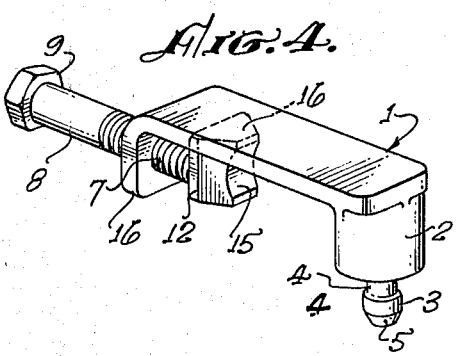
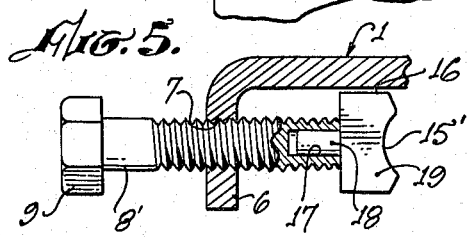
JOHN H. CASTOE,
INVENTOR.
BY
Harold J. DeVisconte
ATTORNEY.

United States Patent Office 3,285,622
Patented Nov. 15, 1966

3,285,622
CASTER AND CAMBER ADJUSTING
CLAMP MEANS
John H. Castoe, 6718 Shady Grove St., Tujunga, Calif.
Filed Oct. 19, 1964, Ser. No. 404,618
4 Claims. (Cl. 280—96.2)

This invention relates to means for effecting the caster and camber adjustment of the front wheels of certain models of automobiles having a chassis embodying a specific form of independently sprung front wheels. In general, the independently sprung front wheel suspension of automobiles includes a member pivotally mounted on the frame of the automobile for swinging movement about a substantially horizointal axis extending substantially parallel to the longitudinal dimension of the vehicle and to the free end of which the spindle or knuckle carrying the front wheels is mounted for oscillatory movement incident to the steering of the vehicle. The adjustment with which this invention is concerned is that which affects the angular position of the axial line of the steering knuckle. This is seldom, if ever, disposed in an exactly vertical position. Depending on the vehicle, it may be inclined slightly so that the upper end of the steering knuckle is in effect sloping downwardly forwardly of a vertical plane extending transversely of the vehicle or rearwardly of such a plane resulting in what is known, respectively, as positive or negative caster adjustments. Similarly it is desirable that the axis of movement of the steering knuckle be at a slight angle with respect to a vertical plane extending parallel to the length of the vehicle and when this slope is downwardly and inwardly toward the vehicle it is known as a positive camber adjustment and when it is inclined downwardly and outwardly laterally from the vehicle it is known as a negative camber adjustment. The angles of such adjustments are very slight and seldom, if ever, exceed about one-half of a degree.

The present invention has for its principal object the provision of a simple, readily attachable and detachable screw clamp means for achieving the desired camber and caster adjustments on a particular make and model of automotive vehicle, certain presently preferred embodiments of the invention being described in the following specification and illustrated in the accompanying drawings which form a part of said specification and in which drawings:

FIG. 1 is a top plan view of a vehicle front wheel mounting of the type for which the present invention is intended, FIG. 2 is a greatly enlarged fragmentary top plan view of the front wheel mounting means at the right hand side of FIG. 1 with a pair of the adjusting clamp devices of the present invention applied thereto, certain portions of the wheel suspension means being also broken away for clearness of illustration, FIG. 3 is a fragmentary transverse section taken on the line 3—3 of FIG. 2, FIG. 4 is a perspective view of one of the clamp devices embodying the present invention, and FIG. 5 is a fragmentary side elevation view of an alternative mode of construction of the invention.

Referring first to FIGS. 1 and 2, the wheel suspension means for which the present invention is especially intended comprises a vehicle chassis generally indicated at F and including side frame members F', F' having front wheels W, W mounted on spindles S, S and these spindles being mounted for steering movement in spring suspension means M for simultaneous movement about substantially vertical axes by the steering mechanism of the vehicle (not shown). The angles of the axes of movement of these spindles is seldom, if ever, disposed in vertical planes parallel to and transverse to the longitudinal dimension of the vehicle but, as described above, are disposed at slight angles thereto.

Since the wheel suspension elements are mirror image duplicates, a description of one will suffice for both. Each frame side member F' is provided with a pair of transversely extending slots S', S' through each of which one each of a pair of bolts B extends upwardly and through an elongated pivot member P which thus may be secured to the upper face of the associated frame side member in any desired position with the range afforded by the bolts and slots whether such positions be adjusted bodily parallel to the length of the vehicle or angularly with respect thereto. Freely pivotally mounted on the opposite ends of the pivot member P is the inboard end of the upper arm A of the wheel suspension assembly, the arm being substantially triangular in plan and the apical outboard end thereof serving as the top bearing for the wheel spindle S. The usual coil spring, not shown, is disposed below this arm and reacts between said arm and other abutment means with which the invention is not concerned, and other means, also not shown, afford bearing support for the lower end of the wheel supporting spindle S in cooperation with the engagement thereof by the upper end of the spindle engaging means on the arm A.

Assuming that the mounting means for the lower end of the steering spindle S bears a fixed relation to the frame F, that as shown the spindle is initially positioned in an exactly vertical position, it will be apparent that having reference to the right hand side of FIG. 1 and to FIG. 2, if the bolts B, B be loosened and the arm A be swung in a clockwise direction as viewed in that figure, the outboard end of the arm A will be swung forward providing a negative caster angle to the spindle pin. Correspondingly, clockwise adjustment of the arm as viewed in plan to an extent which moves the upper end of the spindle pin S rearwardly of the vertical would produce a positive caster adjustment. Similarly bodily lateral adjustment outwardly causing the axis of the spindle movement to be inclined downwardly and inwardly would effect a positive camber adjustment while such inwardly adjustment of the arm A as would cause the spindle to be inclined downwardly and outwardly would effect a negative camber adjustment.

The present invention comprises a screw threaded clamp device including a base member 1 formed of a relatively thin, flat bar of metal having an abutment member 2 depending from one end thereof for a distance sufficient so that when the lower end of said abutment is in engagement with the upper surface of a frame member F', the under side of the bar 1 will clear the upper surface of the pivot member P at a point adjacent to one of the bolts B. The lower end of the abutment 2 terminates in a reduced diameter head 3 which depends therefrom and is spaced from said lower end surface by a groove 4 which is formed in said head and is slightly wider than the thickness of the frame member F' and the extreme end of the head 3 is preferably given a frusto-conical configuration as at 5. The member F' is provided with a pair of holes H, H disposed beyond the outboard side of the pivot member P which are adapted to be entered by the heads 3, 3 of a pair of these clamp devices as thus shown in FIG. 2 and to which further reference will be made.

The opposite end of the base member 1 is bent downwardly as at 6 and is provided with a threaded hole 7 extending therethrough in which a clamp bolt 8 is received extending parallel beneath said base member and said bolt outwardly of the end 6 is provided with a head 9 for engagement by a wrench. The other end 10 of the bolt has a diameter less than the minor diameter of the threaded portion of the bolt and this end loosely engages a socket 11 in a member 12, said member having a set screw 13 engaging a peripheral groove 14 in the end 10 of the bolt to retain the member 12 thereon. The member 12 is provided with a concave face 15 adapted to engage the inboard surface of the portion of the pivot member P to be engaged thereby and with an upper surface 16 which is parallel and closely adjacent to the under face of the base member 1 and operative to maintain the member 12 from rotative movements on the bolt 8.

In use, as best shown in FIGS. 2 and 3, a pair of these clamp devices are installed on the front wheel assembly which is to be adjusted with the grooves 4 of the head members 3 engaging the holes H in the frame member F′ and with the head members 12, 12 engaging the inboard side face of the pivot member P. The bolts B, B are then loosened and the weight of the car on the spring suspension means will tend to move the arm A to the left as viewed in FIGS. 2 and 3 to the extent permitted by the adjustment of the clamp devices. The screws 8, 8 of the devices are then turned one way or the other until the wheel on the associated spindle shall have been given the desired caster and camber angles after which the bolts B, B are tightened and the devices loosened and removed for similar application to the other front wheel of the vehicle.

Referring finally to FIG. 5 there is shown a modified form of the invention in which the distal end of the bolt 8 is provided with an axial bore 17 and in which the pivot member engaging head element is provided with a pin 18 loosely received in said bore whereby head members 19 having different curved end face configurations 15′ may be quickly interchanged for use on vehicles having different forms of pivot members to be engaged by the clamp members. The abutment means at the opposite end of the clamp would be the same as shown in the preceding figures and hence has been omitted from this drawing.

The great advantage of this device is that while the device is being used both the camber and caster angles can be accurately adjusted and held in adjusted position while measurements are taken to insure that the angles are those which are desired. In the particular form of front wheel suspension with which the device is shown, it will be appreciated that variations in a caster angle effected by the device will also, to some extent, effect a variation in the camber angle of the wheel and for this compensation must be made by some additional readjustment but in any event, while the adjustments are being made, the parts being relatively moved incident to the adjustment are always held in whatever position they are being moved to by the adjusting means.

While in the foregoing specification there has been disclosed certain presently preferred embodiments of the invention, the invention is not to be deemed to be limited to the specific details of construction thus disclosed by way of example and it will be understood that the invention includes as well all such changes and modifications in the parts and in the construction, combination and arrangement of parts as shall come within the purview of the appended claims.

I claim:

1. An adjusting means for setting the camber and caster adjustment of the mounting means for the independently sprung wheels of a motor vehicle chassis and in which an elongated pivot member constituting the pivot means for the upper arm of the mounting means for each front wheel extends parallel to the length of the vehicle and is securable in adjusted positions transversely of its length in a horizontal plane relative to the vehicle chassis by separate means adjacent the respective ends of said pivot member; said adjusting means comprising a pair of identical, quick detachable clamp devices, each of said devices including an anchoring means detachably interengageable with a portion of the vehicle chassis at the outboard side of the pivot member and a screw threaded component adjustably movable toward and away from said anchoring means and engageable with the inboard side of the pivot member.

2. A camber and caster adjusting means as claimed in claim 1 in which said anchoring means comprises a depending stud element detachably engageable with an existing hole in the portion of the vehicle and constitutes the sole means of attachment of the device to the vehicle chassis.

3. A camber and caster adjusting means as claimed in claim 1 in which each of said screw clamp devices includes a base member carrying said stud and affording screw threaded support for said screw threaded component.

4. A camber and caster adjusting means as claimed in claim 1 in which said screw threaded, adjustable components of said pair of screw clamp devices engage the pivot member on which the upper arm member of the front wheel suspension means is pivotally mounted at points adjacent the separate means by which the pivot member is secured to the chassis.

References Cited by the Examiner

UNITED STATES PATENTS

| | | | |
|---|---|---|---|
| 3,033,588 | 5/1962 | Muller et al. | 280—96.2 |
| 3,199,837 | 8/1965 | Vestal et al. | 254—1 |
| 3,229,959 | 1/1966 | Smothers | 254—100 |

KENNETH H. BETTS, *Primary Examiner.*